United States Patent [19]
Quinter

[11] Patent Number: 5,092,055
[45] Date of Patent: Mar. 3, 1992

[54] APPARATUS FOR SUPPORTING A WORKPIECE AT A SELECTED ANGLE ON A MACHINE TOOL TABLE

[75] Inventor: Kenneth J. Quinter, Dayton, Ohio

[73] Assignee: TE-CO, Union, Ohio

[21] Appl. No.: 675,682

[22] Filed: Mar. 27, 1991

[51] Int. Cl.⁵ .............................................. G01B 3/30
[52] U.S. Cl. ..................................................... 33/538
[58] Field of Search ................... 33/534, 536, 537, 538

[56] References Cited

U.S. PATENT DOCUMENTS

| | | |
|---|---|---|
| 2,771,821 | 11/1956 | Beusch . |
| 2,816,489 | 12/1957 | Robbins et al. . |
| 3,736,666 | 6/1973 | Sutter ..................................... 33/537 |
| 3,788,633 | 1/1974 | Cho . |
| 3,862,498 | 1/1975 | Kluczmk .............................. 33/538 |
| 4,828,240 | 5/1989 | Longnecker et al. . |

Primary Examiner—Harry N. Haroian
Attorney, Agent, or Firm—Jacox & Meckstroth

[57] ABSTRACT

A workpiece is secured to a support or gang plate which is positioned at an acute angle relative to a base plate by a pair of hollow support blocks or cubes and corresponding angularly adjustable locator plates. The base plate, gang plate and support cubes have precision X-Y grid patterns of threaded holes and precision bores for use with a modular tooling system. Each locator plate is pivotally supported by a dowel or pivot pin projecting from the adjacent support cube and is precisely positioned by a selected gage block which contacts another dowel pin projecting from the adjacent support cube. Cap screws extend through arcuate slots within the locator plates and secure the locator plates to the corresponding support cubes after the gang plate and workpiece are positioned. The locator plates may be reversed on the pivot pins to provide for selecting smaller support angles.

8 Claims, 1 Drawing Sheet

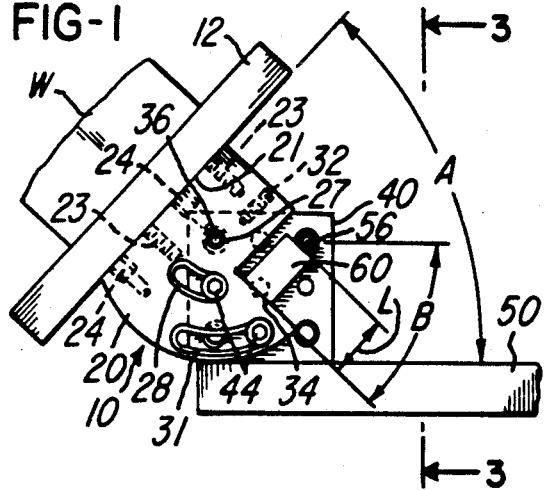
FIG-2
| GAGE BLOCK LENGTH | | |
|---|---|---|
| ANGLE B | ANGLE A | LENGTH L |
| 15° | 75° | .647 |
| 30° | 60° | 1.250 |
| 45° | 45° | 1.768 |
| 60° | 30° | 2.165 |
| 75° | 15° | 2.415 |
| 90° | 0° | 2.500 |
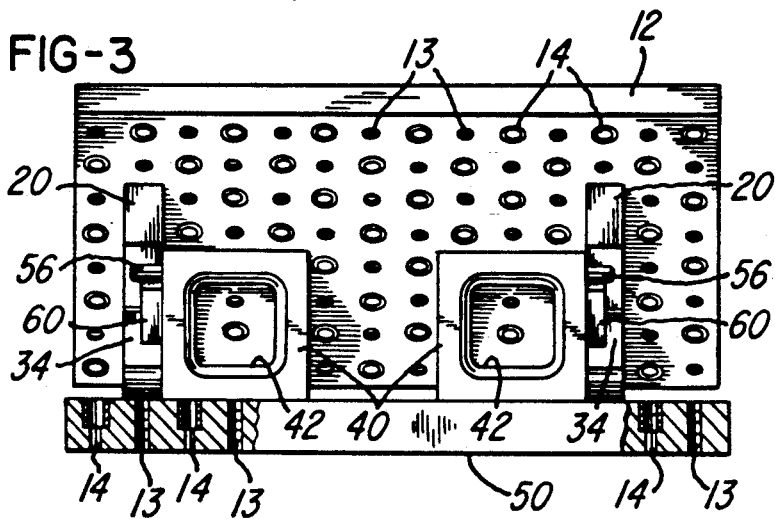
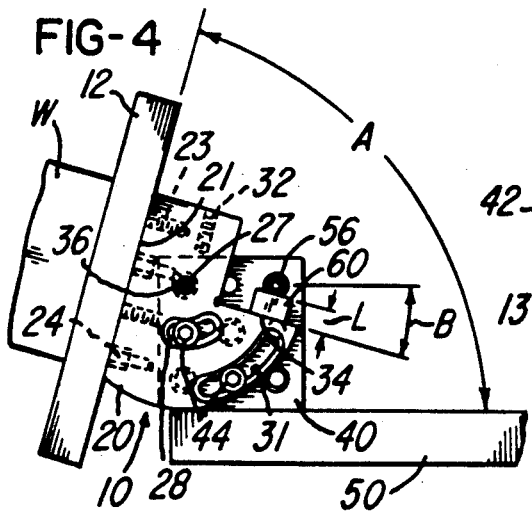
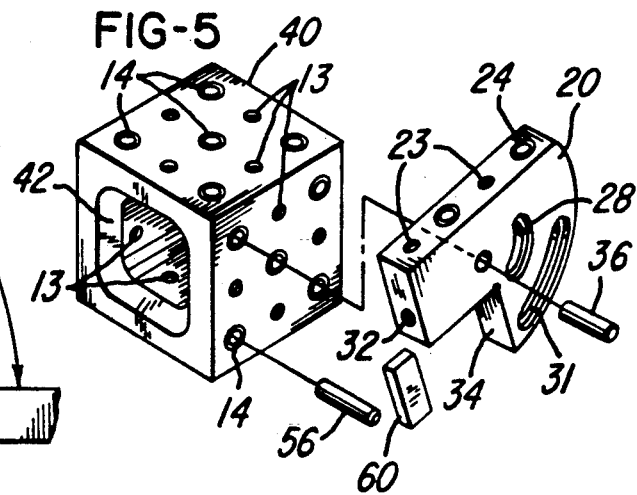

APPARATUS FOR SUPPORTING A WORKPIECE AT A SELECTED ANGLE ON A MACHINE TOOL TABLE

BACKGROUND OF THE INVENTION

In a modular tooling system, for example, of the type disclosed in U.S. Pat. No. 4,828,240 issued to the assignee of the present invention, it is frequently desirable to provide for supporting a workpiece at a predetermined angle relative to the movable table of a machine tool. Some workpieces may be positioned at a particular angle relative to the workpiece table by using an angular adjustment plate as shown in FIGS. 9 and 10 and described in column 5 of the above patent. However, sometimes it is necessary to position a workpiece at an inclined angle relative to a modular base plate having a precision X-Y grid pattern of threaded holes and precision bores with parallel axes. While an adjustable angle or sine plate, for example, as disclosed in U.S. Pat. No. 2,771,821, U.S. Pat. No. 3,788,633 and U.S. Pat. No. 2,816,489, may be used for this purpose, it is desirable to have an angular locating or positioning system which is simple and easy to use, especially with a modular tooling system. It is also desirable for the system to provide for quickly and accurately positioning a workpiece at a desired angle relative to the table and for positively securing the workpiece at the selected angle so that the workpiece may be accurately machined without vibration.

SUMMARY OF THE INVENTION

The present invention is directed to an improved angular support apparatus or device which is ideally suited for use with a modular tooling system and which provides all of the desirable advantages and features mentioned above for locating a workpiece at a precision angle relative to the modular tooling components carried by the table of a machine tool. More specifically, the support apparatus of the invention provides for precisely and quickly locating a workpiece at a selected angle between 0° and 90° relative to a base plate and for positively securing the workpiece at the selected angle.

In accordance with one embodiment of the invention, a workpiece support or gang plate has a precision X-Y grid pattern of threaded holes and precision bores and is secured to a pair of parallel spaced angle locator plates each having a precisely located stop surface. The locator plates are pivotally supported by a set of dowel pins projecting from a corresponding pair of hollow support blocks or cubes having parallel spaced walls each with a precision X-Y grid pattern of threaded holes and precision bores. The support cubes are secured to a base plate also having a precision X-Y grid pattern of threaded holes and precision bores. The workpiece supporting gang plate and locator plates are precisely positioned at a predetermined angle by using a selected standard machinist gage block which is positioned between the stop surface on one of the locator plates and a dowel pin projecting outwardly from a precision bore within the adjacent support cube. Each locator plate has a set of arcuate slots which receive machine screws for securing the locator plate to the adjacent support cube after the angular position is established.

Other features and advantages of the invention will apparent from the following description, the accompanying drawing and the appended claims.

BRIEF DESCRIPTION OF THE DRAWING

FIG. 1 is a side elevation view of apparatus constructed in accordance with the invention for supporting a workpiece at a selected angle;

FIG. 2 is a chart illustrating typical gage block lengths for corresponding angular positions of the apparatus shown in FIG. 1;

FIG. 3 is a section taken generally on the line 3—3 of FIG. 1;

FIG. 4 is a view similar to FIG. 1 and illustrating another angular position of the apparatus; and FIG. 5 is an exploded perspective view of components used in the apparatus shown in FIGS. 1, 3 and 4 and illustrating the orientation of the components for supporting a workpiece at smaller angular positions.

DESCRIPTION OF THE PREFERRED EMBODIMENT

Referring to FIGS. 1 and 4, a workpiece W may be supported at an angle A between 0° and 90° relative to the table surface (not shown) of a machine tool by an angular positioning apparatus or assembly 10. The assembly 10 includes a rectangular support or gang plate 12 having a precision X-Y grid pattern of threaded holes 13 and precision bores 14, preferably constructed as shown in FIG. 2 of above-mentioned U.S. Pat. No. 4,828,240. The workpiece W is secured to the plate 12 by clamping means (not shown) such as disclosed in connection with FIGS. 3-8 in U.S. Pat. No. 4,828,240, the disclosure of which is herein incorporated by reference.

The gang plate 12 is secured to a pair of angle locator plates 20 each having a flat surface 21 with a set of blind threaded holes 23 and blind precision bores 24 for receiving corresponding cap screws and dowel pins (not shown) which precisely locate and secure the gang plate 12 to the pair of locator plates 20. Each of the locator plates 20 also includes a precision bore 27, a set of arcuate slots 28 and 31 with internal shoulders, a threaded hole 32 and a precision flat surface 34 which is perpendicular to the surface 21.

The sub-assembly of the gang plate 12 and locator plates 20 is pivotally supported by a pair of dowel or pivot pins 36 which extend into the holes or bores 27 within the plates 20 and project outwardly from corresponding bores 14 within a pair of hollow utility cubes or block members 40. Each of the cubes or members 40 has one set of opposite side walls which define access openings 42, and the other four side walls each has a precision X-Y grid pattern of threaded holes 13 and precision bores 14. As mentioned above and shown in FIG. 1, the dowel or pivot pins 36 project outwardly from corresponding precision bores 14 within the corner portions of the adjacent side walls of the corresponding cube members 40. A pair of socket head cap screws 44 extends through each set of arcuate slots 28 and 31 within the locator plates 20 and are threaded into a pair of the threaded holes 13 within adjacent side walls of the cube members 40.

The pair of utility cubes or block members 40 are precisely positioned on a base plate 50 which also has a precision X-Y grid pattern of threaded holes 13 and precision bores 14. Each of the block members 40 is located on the base plate 50 by means of a pair of dowel pins (not shown) which extend through aligned precision bores 14 within the bottom wall of each block member 40 and within the base plate 50. A corresponding pair of socket head cap screws (not shown) secure each of the block members 40 to the base plate 50. The access opening 42 within opposite sides of each cube or block member 40 provided for inserting the locator pins and/or cap screws through the bottom wall of the block member and into the base plate 50.

Referring to FIGS. 1 and 4, when it is desired to position the gang plate 12 and the supporting workpiece W at a predetermined angle A with respect to the base plate 50, a dowel or locator pin 56, which is identical to the pivot pin 36, is inserted into a precision bore 14 within the rearward upper corner portion of one of the cube or block members 40 and in parallel spaced relation to the surface 34 on the adjacent locator plate 20. A standard rectangular gage block 60 with a predetermined length L, is selected from a gage block set according to a chart such as the chart shown in FIG. 2. The gage block 60 is selected according to the desired angle A and the corresponding angle B measured from the surface 34 on the one locator plate 20 and a reference plane defined by the axes of the dowel pins 36 and 56 projecting from the adjacent support cube or block 40. The selected gage block 60 is positioned between the surface 34 on the one locator plate 20 and the opposing dowel pin 56, and the locator plates 20 and connecting gang plate 12 are rotated on the pins 36 to the selected angle when the selected gage block 60 is firmly confined between the surface 34 and opposing dowel pin 56. The cap screws 44 within the arcuate slots 28 and 31 of each locator plate 20 are then tightened to secure the gang plate 12 at the desired angle A.

When the locator plates 20 are assembled to the gang plate 12 in the positions shown in FIGS. 1 and 4, an angle A may be selected anywhere between 45° and 90° by selecting the corresponding gage block 60 from a chart such as shown in FIG. 2. When it is desired to select an angle A between 0° and 45°, the locator plates 20 are reversed on the gang plate 12 or the sub-assembly of the gang plate 12 and locator plates 20 is reversed on the block members 40 so that the locator plates 20 are orientated as shown in FIG. 5 with respect to the block members 40. The dowel pin 56 is then inserted into a bore 14 located within a lower corner portion of one of the cube members 40 and in parallel relation to the opposing surface 34 on the adjacent locator plate.

From the drawing of the above description, it is apparent that a device or apparatus constructed in accordance with the present invention for supporting a workpiece at a selected precise angle relative to a base plate or table of a machine tool, provides desirable features and advantages. For example, the device shown in the drawing is ideally suited for use with a modular tooling system as disclosed in abovementioned U.S. Pat. No. 4,828,240 and provides for using dowel pins and standard gage blocks for precisely positioning a workpiece W at a desired predetermined angle between 0° and 90°. In addition, when the locator plates 20 are clamped or secured to the locator cubes or blocks 40 by tightening the cap screws 44, the workpiece W is rigidly supported to to avoid any vibration during machining of the workpiece. The precision angular locating device of the invention is also simple and easy to use by simply selecting a standard gage block or set of gage blocks corresponding to the desired angular position for the workpiece and placing the block or set of blocks between the pin 56 and surface 34 on one of the location plates.

While the form of workpiece supporting apparatus herein described constitutes a preferred embodiment of the invention, it is to be understood that the invention is not limited to this precise form of apparatus, and that changes may be made therein without departing from the scope and spirit of the invention as defined in the appended claims.

The invention having thus been described, the following is claimed:

1. Apparatus adapted for use with a modular tooling system for supporting a workpiece at a selected precise angle relative to the table of a machine tool, said apparatus comprising a base plate including means defining a precision X-Y grid pattern of threaded holes and precision bores having parallel axes, a gang plate including means defining a precision X-Y grid pattern of threaded holes and precision bores having parallel axes and adapted to be used for connecting the workpiece to said gang plate, a hollow locator cube member including opposite parallel spaced outer walls each having an outer surface and means defining a precision X-Y grid pattern of threaded holes and precision bores with parallel axes, a locator plate secured to said gang plate and disposed adjacent one of said outer surfaces of said cube member, a pivot pin connecting said locator plate to said cube member and providing for tilting said gang plate on the axis of said pivot pin, a locator pin projecting outwardly from said one outer surface of said cube member, said locator plate having a precision stop surface opposing said locator pin and adapted to receive a selected precision gage block therebetween for precisely positioning said locator plate and said gang plate at a predetermined angle relative to said base plate, and means for rigidly securing said locator plate to said cube member after said gang plate is positioned at the selected angle as determined by said gage block.

2. Apparatus adapted for use with a modular tooling system for supporting a workpiece at a selected precise angle relative to the table of a machine tool, said apparatus comprising a base plate including means defining a precision X-Y grid pattern of threaded holes and precision bores having parallel axes, a gang plate including means defining a precision X-Y grid pattern of threaded holes and precision bores having parallel axes and adapted to be used for connecting the workpiece to said gang plate, a set of spaced support members removably secured to said base plate by said holes and bores and having parallel spaced outer surfaces, a set of locator plates removably secured to said gang plate by said holes and bores and disposed adjacent said outer surfaces of said support members, a set of aligned pivot pins connecting said locator plates to said support members and providing for tilting said gang plate on the axis of said pivot pins, a locator pin projecting outwardly from said outer surface of one of said support members, one of said locator plates having a precision stop surface opposing said locator pin and adapted to receive a selected precision gage block therebetween for precisely positioning said locator plates and said gang plate at a predetermined angle relative to said base plate, and means for rigidly securing said locator plates to the corresponding said support members after said gang plate is positioned at the selected angle as determined by said gage block.

3. Apparatus as defined in claim 2 wherein said one support member includes means defining a precision X-Y grid pattern of threaded holes and precision bores with parallel axes and within said outer surface for receiving said locator pin and said securing means.

4. Apparatus as defined in claim 2 wherein said one locator plate is adapted to be reversed relative to said block member for positioning said gang plate at an angle between zero degrees and forty-five degrees relative to said base plate.

5. Apparatus as defined in claim 2 wherein each of said support members comprises a hollow locator cube member including opposite parallel spaced outer walls each having means defining a precision X-Y grid pattern of threaded holes and precision bores with parallel axis, and said outer walls of each said cube member from corresponding said outer surfaces adjacent said locator plates.

6. Apparatus adapted for use with a modular tooling system for supporting a workpiece at a selected precise angle relative to the table of a maching tool, said apparatus comprising a base plate including means defining a precision X-Y grid pattern of threaded holes and precision bores having parallel axes, a gang plate including means defining a precision X-Y grid pattern of threaded holes and precision bores having parallel axes and adapted to be used for connecting the workpiece to said gang plate, a pair of spaced support members each having a bottom wall and an outer wall including means defining a precision X-Y grid pattern of threaded holes and precision bores having parallel axes, means within said holes and bores for removably securing said support members to said base plate, a set of parallel spaced locator plates secured to said gang plate by said holes and bores and disposed adjacent said outer walls of corresponding said support members, a set of aligned pivot pins connecting said locator plates to said outer walls of the corresponding said support members and providing for tilting said gang plate and said locator plates on the axis of said pivot pins, a locator pin projecting outwardly from one of said bores within said outer wall of one of said support members, said locator plate adjacent said one support member having a precision stop surface opposing said locator pin and adapted to receive a selected precision gage block therebetween for precisely positioning said locator plates and said gang plate at a predetermined angle relative to said base plate, and means for rigidly securing each said locator plate to the corresponding said support member after said gang plate is positioned at the selected angle as determined by said gage block.

7. Apparatus as defined in claim 6 wherein said locator plates are adapted to be reversed relative to said support members for positioning said gang plate within a different range of angles relative to said base plate.

8. Apparatus as defined in claim 6 wherein said support members comprise hollow locator cube members having said parallel spaced said outer walls each having said X-Y grid pattern of threaded holes and precision bores with parallel axes, and both of said pivot pins project into said bores within said outer walls of said cube members.

* * * * *